May 30, 1933.  J. W. PETERSON  1,911,645
CHART READING APPARATUS
Filed July 8, 1930  3 Sheets-Sheet 1
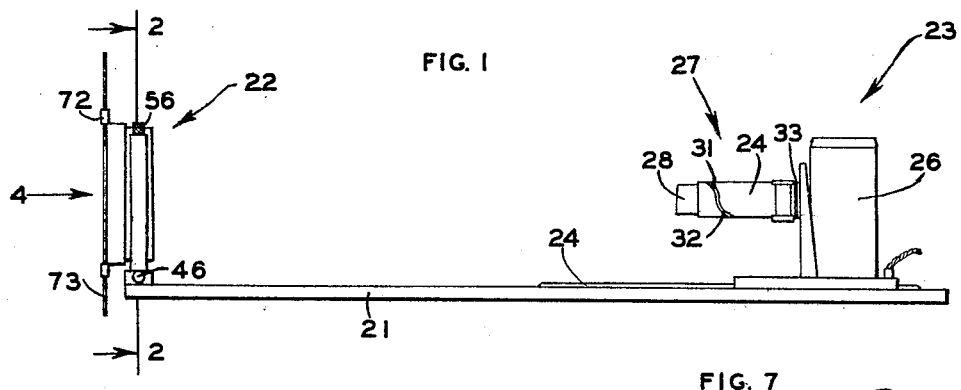
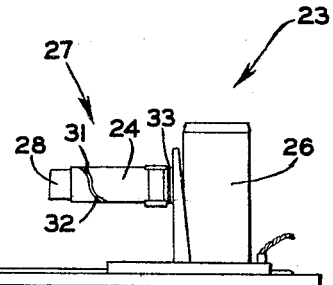
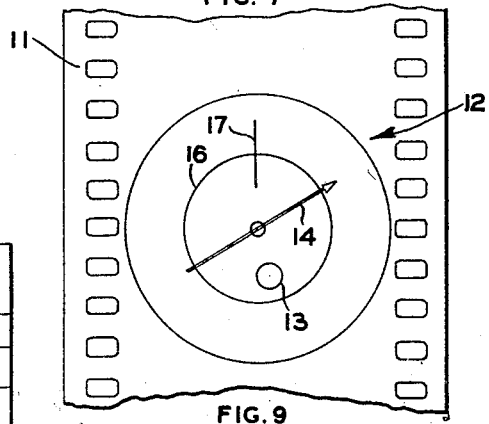
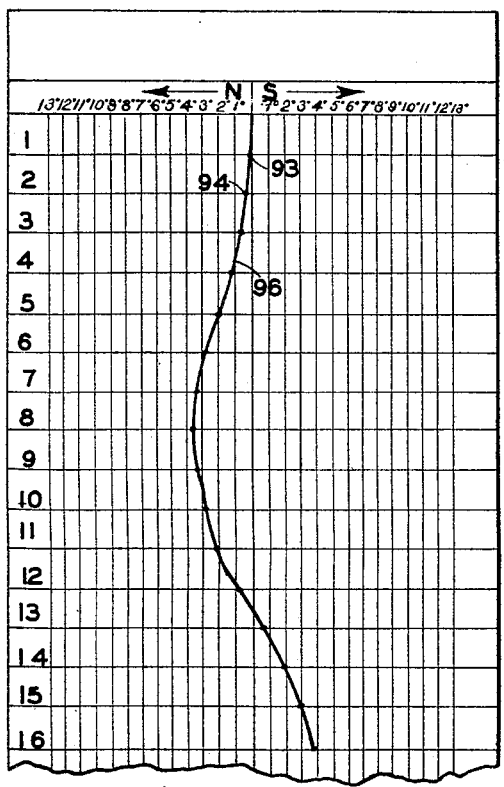
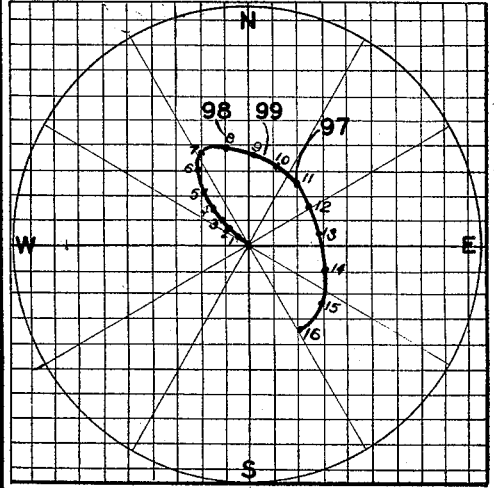
INVENTOR
J. W. PETERSON
BY Hazard and Miller
ATTORNEYS May 30, 1933.   J. W. PETERSON   1,911,645
CHART READING APPARATUS
Filed July 8, 1930   3 Sheets-Sheet 2
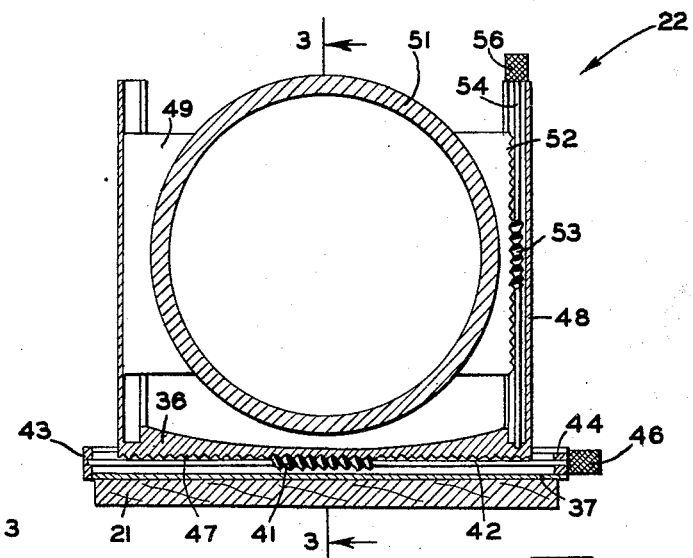
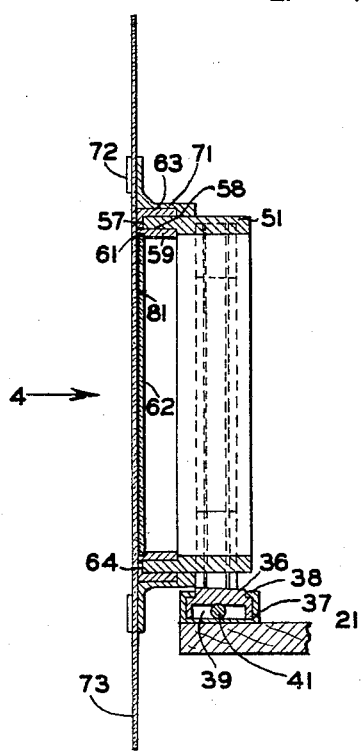
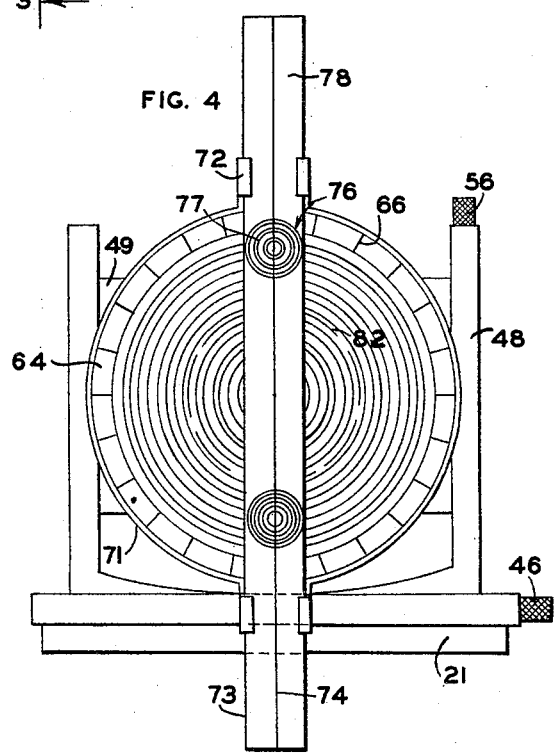
INVENTOR
J. W. PETERSON
BY *Hazard and Miller*
ATTORNEYS May 30, 1933.  J. W. PETERSON  1,911,645
CHART READING APPARATUS
Filed July 8, 1930   3 Sheets-Sheet 3

INVENTOR
J. W. PETERSON
BY
ATTORNEYS

Patented May 30, 1933

1,911,645

UNITED STATES PATENT OFFICE

JOHN W. PETERSON, OF LOS ANGELES, CALIFORNIA

CHART READING APPARATUS

Application filed July 8, 1930. Serial No. 466,478.

This invention relates to well surveying apparatus, and has for an object the provision of a method and means for charting the deviation of a well from true vertical, throughout the entire depth of that well.

A more detailed object is the provision of a method and means for reading and charting the data obtained from the series of photographic charts produced by the well surveying apparatus forming the subject matter of my copending application, Serial No. 424,277, filed January 29, 1930.

A further object is to provide an apparatus for reading with a high degree of accuracy, the data obtained by means of a photographic chart having thereon means indicating the position of the camera with respect to the points of the compass at the time the photograph was taken, and means indicating the angularity from the vertical and the direction with respect to the points of the compass, of the deviation from the vertical, of that portion of the well within which the camera was located when the photograph was taken.

Another object is to provide a method of making a chart showing graphically the direction and extent of the deviation of a well hole from the vertical, which comprises successively projecting upon the screen, the images of the photographic charts obtained by the well surveying apparatus of my copending application hereinbefore mentioned, obtaining by means of suitably arranged calibrations on the screen and by means of the projected image of each photograph, the data necessary to show the extent and direction of the deviation of the well from the vertical at the point at which the photograph was taken, and making a graphic chart of the data thus obtained.

A still further object is to provide means for attaining and means for indicating the attainment of accurate registration of the projected image of each photograph with respect to the calibrations on the projection screen, thereby insuring extreme accuracy in reading the data from the relatively large projected image.

Another object is to provide a method and apparatus of the general character described, which, while being accurate to an extremely high degree, are relatively simple and capable of being employed in making a graphic chart with extreme rapidity and without the necessity of resorting to any mathematical computations.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a view in side elevation, of the apparatus utilized in carrying the method of the present invention to completion;

Fig. 2 is an enlarged, transverse, vertical sectional view, the plane of section being indicated by the line 2—2 of Fig. 1, and the direction of view by the arrows;

Fig. 3 is a longitudinal, vertical sectional view of that portion of the apparatus with which the projection screen is associated, the plane of section being indicated by the line 3—3 of Fig. 2 and the direction of view by the arrows;

Fig. 4 is an end elevation, the direction of view being indicated by the arrows 4 of Figs. 1 and 3;

Figure 5:
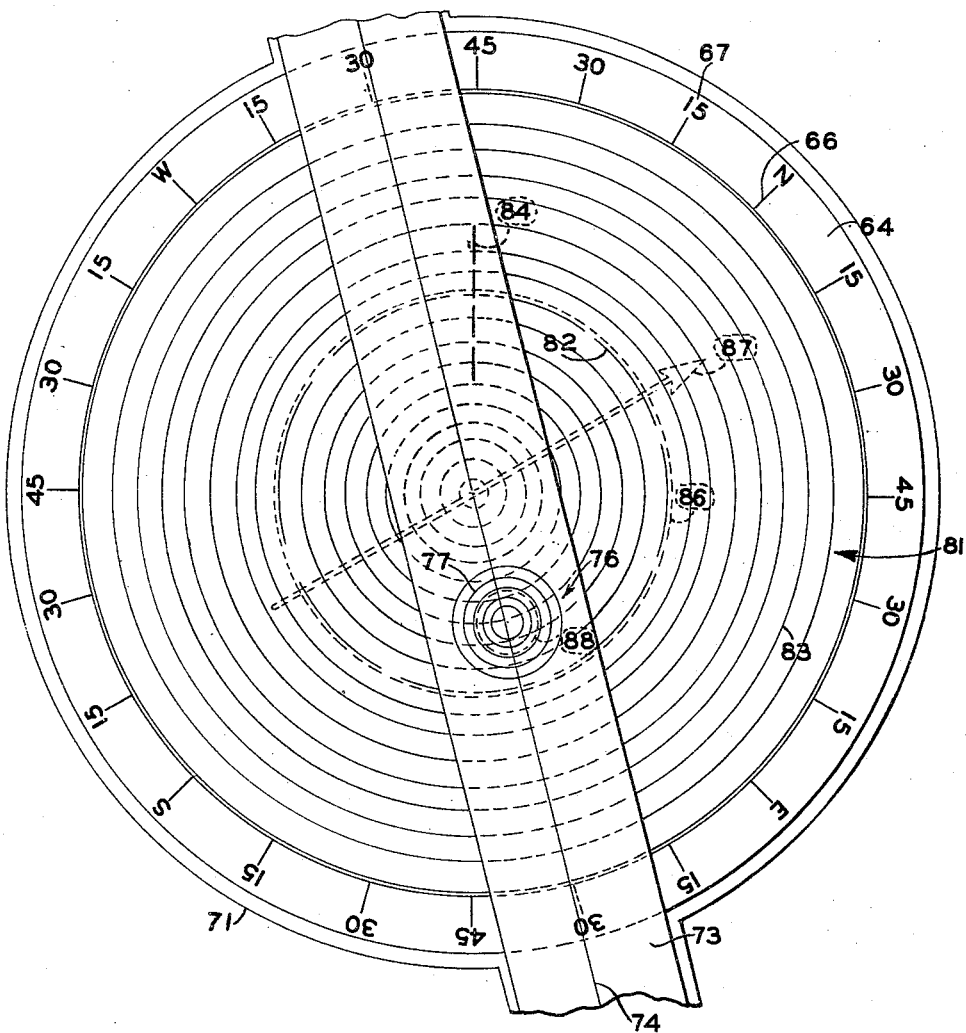
Figure 6:
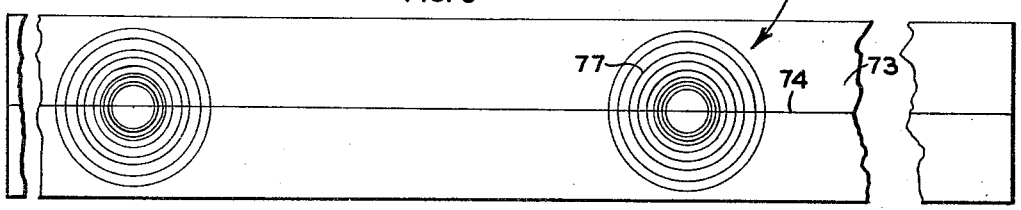

Fig. 5 is an enlarged view of the projection screen similar to Fig. 4, and showing in dashed lines the projected image of a photographic chart. This view also shows the adjustable calibration ring and the rotatable rule which is utilized in obtaining the desired data. Portions of the Figure have been broken away to reduce its size;

Fig. 6 is a view of the rule alone, portions being broken away to reduce the size of the Figure;

Fig. 7 is a view showing one of the photographic charts obtained by the well surveying apparatus of my copending application;

Fig. 8 is a view showing a portion of one form of graphic chart obtained by means of the data which is read by means of the apparatus of the present invention;

Fig. 9 is a view showing another of the charts.

In order to facilitate the explanation of the method and apparatus of the present invention, a brief description of the well surveying apparatus forming the subject matter of my aforesaid copending application and the photographic chart obtained thereby will be here included. The surveying apparatus comprises a circular spirit level and a compass arranged in vertical alignment above a light source, so that an image of the bubble of the level and of the compass needle may be formed upon a sensitized film thereabove, a suitable lens being arranged between the film and the compass and level so as to bring the image into accurate focus. A clockworks causes periodic energization of the source of light for a given interval; and the period between successive energizations is sufficient to permit lowering the apparatus a given distance into the well, this distance usually being determined by the length of each successive stand of drill pipe which is added to those already assembled and to the lower end of which the surveying apparatus is attached to permit of its being lowered into the well to be surveyed. The film is automatically advanced between successive energization of the light source, so as to bring an unexposed portion thereof into the field of the lens. Hence, after the apparatus has been brought to the surface and the film 11 has been developed, a series of photographic records are obtained. One such record or chart is indicated at 12 on Fig. 7. Each chart shows the degrees of deviation from the vertical, of that portion of the well within which the apparatus was situated when the image was taken, by the distance of the center of the image 13 of the bubble from the point on the chart at which the center of the image of the bubble would have been located had the apparatus been truly vertical; and the direction toward which the deviation occurs, is shown by the angular displacement from the image 14 of the compass needle, of a line joining the center of the image of the bubble with the said point on the film indicating true vertical. This point on the film is indicated by the image 16 of a circle inscribed upon the crystal of the level with said point as a center; and a radial line on the crystal also makes a radial image 17 on each photographic record 12, the purpose of which will be explained hereinbelow.

The apparatus of the present invention comprises an elongated base 21 having a screen supporting structure 22 erected at one end, and an optical projector 23 of conventional design, mounted at the other end. Preferably the projector 23 is mounted upon longitudinally extending tracks 24 permitting variation of the distance between the projector and the screen supporting structure 22. Although the construction of the projector 23 forms no portion of the present invention, it should be explained that it comprises a lamp housing 26 having a telescopically arranged lens barrel 27 rigid with the front thereof. The inner portion 28 of the lens mounting, may be adjusted longitudinally within the outer portion 29 by means of a pin 31 which is rigid with the inner portion 28 and which is slidable within a spiral slot 32 so as to effect longitudinal adjustment of the inner portion 28 within the outer portion 29, and in this manner, to effect securing accurate focusing of the image projected onto the screen supported by the screen structure 22. A slot 33 is provided adjacent the inner end of the lens mounting 27, and a strip of developed film 11 is receivable within the slot 33. The parts are so proportioned and arranged that an image of a single photographic chart or record 12 may be projected at one time, upon the screen carried by the supporting structure 22; and after the desired data has been obtained from this projection, the film 11 may be adjusted to bring another chart 12 into register with the lenses of the projector 23 so that its image is then projected onto the screen.

The screen supporting structure 22 comprises a transversely extending carriage 36 which is mounted for transverse sliding adjustment within a track 37. Preferably the track 37 is channel-shaped in cross section, and is provided with flanges 38 slidably engaging the upper surface of the carriage 36 so as to retain the carriage against vertical displacement but to permit lateral adjustment thereof with respect to the track 37. A recess 39 formed in the under surface of the carriage 36, accommodates a transversely extending screw 41 which is carried by a shaft 42, this shaft being journalled in suitable bearing plates 43 and 44 secured at the ends of the track 37. One end of the shaft 42 extends through the associated bearing plate 44 and carries a knurled head 46 which facilitates imparting rotary motion to the shaft 42. The screw 41 engages the teeth 47 of a rack which is formed on the under surface of the carriage 36 so that when the rod 42 is rotated, the carriage 36 is moved longitudinally of the track, i. e., transversely with respect to the base 21.

At each end of the carriage 36, a post 48 extends vertically upwards. Each of these posts is of channel-shaped construction and is adapted to slidably receive the outer edge of a vertical flange 49 of a cylindrical head 51. Rack teeth 52 are formed upon the outer edge of one of the flanges 49, to be engaged by a vertically extending screw 53 carried by a shaft 54 which is journalled longitudinally of the associated post 48. A knurled head 56 is provided upon the upper end of the shaft 54 so as to facilitate turning the shaft and the screw 53 so as to effect vertical adjustment of the cylindrical head 51.

The cylindrical head 51 is arranged with its axis extending horizontally and substantially in alignment with the lenses of the projector 23. The outer end 57 of the head 51 is counterbored as indicated at 58, to receive a cylindrical frame 59 which is fitted within the counterbore 58 sufficiently accurately to releasably retain the frame 59 in position coaxially with the head 51 and to permit rotation of the frame 59 about the axis common to itself and the head 51. The outer end of the frame 59 is also provided with a counterbore 61 adapted to releasably retain a disc 62 of transparent and preferably rigid material such as celluloid.

A ring 63 is rotatably mounted upon the outer circumference of the cylindrical head 51, and carries an annular flange 64 extending inwards therefrom across the outer end 57 of the head 51, so as to position the inner circumferential edge of the flange 64 closely adjacent the outer circumferential edge of the disc 62. This annular flange 64 has graduations 66 laid off thereupon, these graduations being spaced at equal intervals about the entire circumference of the flange 64, and the number of graduations 66 preferably being some number evenly divisible into 360. Inasmuch as these graduations indicate points of the compass, I prefer to employ twenty-four, under which circumstances, the spacing between each adjacent pair of graduations 66 is equivalent to 15°, i. e., if one graduation indicates true north, that next adjacent thereto and upon the right hand side thereof, would indicate 15° east of north. Accordingly, each graduation 66 has a calibration 67 inscribed thereadjacent. Diametrically opposite graduations 66 have "N" or "north" and "S" or "south" respectively, associated therewith, whereas another pair of graduations 66 on the diameter measured perpendicularly with respect to the diameter measured through the "north" and "south" calibrations, have "E" or "east" and "W" or "west" respectively, associated therewith. The calibrations lying between those identified in this manner, are successively labeled "15" "30" "45" "30" and "15", as clearly shown upon Fig. 5.

Outside the ring 63 and upon the cylindrical head 51, another ring 71 is fitted. At diametrically opposite points upon the ring 71, guides 72 are provided. These two guides 72 are in alignment with each other and are adapted to slidably receive a strip 73 of transparent material such as celluloid. The parts are so proportioned and arranged that the strip 73 extends across the disc 62 with a line 74 which is inscribed upon the strip 73, passing accurately through the center of the disc 62 so that this line 74 represents a true diameter thereof. However, inasmuch as the ring 71 which carries the strip 73, is rotatable upon the cylindrical head 51, the strip 73 may be swung to any desired position without removing the line 74 from true diametrical relationship with the disc 62. A group 76 of concentrically arranged circles 77 is inscribed at a plurality of locations upon the strip 73, with the centers common to all the circles 77 of each group intersected by the line 74. A sufficient length 78 of the strip 73, extends outwards beyond each group 76 of circles, thus permitting either one group 76 or the other to be brought into registration with any portion of the disc 62 without sliding the strip 73 out of either of its guides 72.

The transparent disc 62 may serve as the projection screen itself, in which event the disc 62 should have a matte surface, i. e., a surface roughened similarly to ground glass, so as to make visible the image projected thereupon by the projector 23. However, I prefer to employ transparent material for the disc 62 and to use for the screen, a circular sheet 81 of translucent material such as tracing-cloth or paper. This circular sheet 81 corresponds in diameter to the disc 62, so that the effect is the same as if the sheet 81 were omitted and the disc 62 given a matte surface.

In order to attain the highest possible degree of accuracy in reading the data obtained by means of the apparatus of the present invention, I prefer to make a projection screen 81 for each of my well surveying instruments. It has been found that it is practically impossible to grind a crystal such as that employed in the compass of each of my surveying instruments, with a truly spherical concave surface, and to mount the crystal in the surveying instrument so that the bubble of the level floats to the exact center of the lens when the instrument is held in a truly vertical position. Accordingly, after each instrument has been assembled, I position that instrument absolutely vertically, and then indicate on the crystal of the compass, the point with which the exact center of the bubble registers. About the point on the crystal, the position of which is ascertained in this manner, a circle is engraved in the glass with the said point as the center of the circle. A radially extending line is also engraved upon the surface of the crystal, preferably intersecting the circle. I then photograph the engraved crystal by means of the camera which forms a portion of the surveying instrument, and after the film has been developed, project the photographic image of the engraved circle and radial line onto the screen 81 which is to be associated with that particular surveying instrument. A circle 82 is marked upon the screen coinciding with the projected image of the photographic image of the circle engraved upon the crystal, and a radial line is marked on the screen coinciding with the projected image of the photographic image of the radial line upon the crystal. The center of the circle 82 thus drawn upon the screen 81, is then located; and a plurality of concentric circles 83 drawn upon the screen 81 with this point which corresponds to the position of the center of the bubble of the compass when the surveying instrument is truly vertical as the center common to all the circles 83. The circles 83 are drawn in such a manner that the radial spacing therebetween represents distance that the bubble of the compass moves when the surveying instrument is tipped one degree. In other words, if a photographic chart 12 be made with the surveying instrument inclined one degree from the vertical and the chart 12 after development, projected upon the screen 81, it will be found that the center of the projected image of the bubble will lie upon the innermost circle 83. If the same procedure is resorted to with the surveying instrument inclined two degrees from the vertical, the projected image of the bubble would be found to lie upon the second smallest circle, and so on. The proper spacing between the successive circles 83 is determined by experimentation, so that they are inscribed with the utmost accuracy upon the screen 81 associated with each surveying instrument.

At the time the centering circle 82 is inscribed upon the screen 81, a radial line 84 is also inscribed thereupon in coincidence with the projected image of the radial line 17 on the photographic chart 12. Hence, when a projection of any one of the photographic images 12 is cast upon the screen 81, the screen should first be rotated until the line 84 is brought into registration with the projected image of the line 17 on the chart 12, so as to insure proper registration of corresponding portions of the projected image and the screen, and thus serve to still further eliminate any possible sources of error. For example, if the crystal of the compass is not in truly horizontal plane when the surveying instrument is vertical, it will be found that the projection of the point on each photographic chart 12, which corresponds to the position of the center of the bubble when the instrument is in vertical position, will not always be in the same position. However, by providing the radial line 84 on the screen in proper position in respect to the radial line engraved on the crystal of the compass, this possibility of error is eliminated.

*Operation*

Upon completion of the running of a survey of a well hole, the surveying apparatus is brought to the surface, the exposed film removed therefrom, and developed in the well-known manner and dried. The film is then inserted into the slot 33 of the projector 23, and one of the photographic charts 12 brought into registration with the lenses of the projector so as to project an image of the selected chart 12 (which should be the first photographic chart of the survey) projected onto the screen 81 associated with the surveying instrument which has been employed, this screen having been mounted within the holder-ring 59. The image is first brought substantially into focus, and the screen 81 is then oriented with respect to the projected image, i. e., the screen 81 is rotated to bring the radial line 84 into registration with the projected image of the radial line 17 on the photographic chart 12. The projector 23 is then slid toward or away from the screen 81, so as to vary the size of the projected image 86 of the circle 16 which is a photographic record of the circle inscribed on the crystal of the compass, refocusing the projector if necessary, after such variation of distance has been effected. If it is then found that the circle 82 does not exactly register with the projected image of the circle 16, the screen 81 may be adjusted transversely and vertically by means of the knurled heads 46 and 56 respectively, so as to insure accurate alignment of corresponding points of the screen 81 and of the projected image of the photographic chart 12 indicating the position of the center of the bubble of the level when the surveying instrument is truly vertical.

Preferably the circular line 82 is broken at several points, so that it does not entirely obscure the projected image 86 of the circle 16, it being remembered that the screen 81 is translucent and is viewed from the side opposite the projector 23. It should be explained however, that the apparatus is arranged in this manner only as a matter of convenience, but could be operated equally well by projecting the image onto an opaque screen and viewing the screen from the side thereof upon which the projector is located.

The graduated ring 64 is then turned to bring into alignment with the projected image 87 of the photographic image 14 of the compass needle, the particular graduation 66 corresponding to the magnetic declination at the location of the well which has been surveyed. For example, consider the magnetic declination at that particular locality, to have been 15° east of north. Then the graduated ring 63 should be rotated to bring the graduation 66 next to that identified by the calibration "N" or "north"

and toward the graduation identified by the calibration "E" or "east" into register with the projected image 87, as shown upon Fig. 5. Then the ring 71 which carries the strip 73, should be rotated until the line 74 on the strip 73, passes through the circular, projected image 88 of the photographic image 13 of the bubble of the level. Inasmuch as the projected image 88 will be of considerable diameter, it would be difficult to locate the true center thereof without utilizing either one or the other of the groups 76 of concentrically arranged circles 77. The ring 71 should be rotated until the line 74 passes approximately through the center of the projected image 88 of the bubble, and then the strip 73 should be slid within its guides 72, until one of the groups 76 of circles 77 is substantially in register with the projected image 88. It will be an easy matter then, to sight the circle 77 most nearly of the same diameter as the projected image 88, and to discern any displacement of that circle from the image 88 of the bubble. When this discrepancy has been observed, the ring 71 may be rotated to bring the circles 77 of the selected group 76, accurately into alignment with the center of the projected image 88, thus causing the line 74 to intersect the exact center of the projected image 88.

The point at which the line 74 passes across the graduated ring 64, should then be observed; and the angular displacement of the center of the bubble from true north may then be read by means of the calibrations and graduations 67 and 66 respectively. Upon Fig. 5, this value would read approximately 31° south of east. In this manner is indicated the direction in which the well deviates from the vertical at the point at which the instant photographic chart 12 was taken.

The extent of this deviation, that is, the degrees of angularity of this portion of the well with respect to the vertical, may be ascertained by counting the number of rings 83 between the center of the image 88 of the bubble and the common center of all the rings 83. On Fig. 5, this value is indicated as being approximately 7⅕°.

The data thus obtained are recorded preferably in tabulated form upon a suitably arranged data sheet opposite the number of stands of drill pipe which supported the surveying instrument at the time the instant exposure was made. Inasmuch as the length of each stand of pipe is known, the depth to which the instrument had been sunk at that time, can easily be ascertained; and this value also should be tabulated opposite the associated data. When this has been accomplished, another photographic image 12 should be brought into register with the lenses of the projector 23, the necessary adjustments of the projector and/or projection screen 81 effected, and the corresponding data obtained and recorded. These steps should be carried out for each of the several photographic charts 12 obtained during the complete survey of the well.

From these tabulated data are obtained graphic charts 91 and 92 illustrated upon Figs. 8 and 9 respectively. Upon Fig. 8, the number of the stands of pipe are represented as abscissa, whereas the extent of the deviation toward the north or south, as the case may be, are represented as ordinates. For example, upon Fig. 8, the first plotted point 93 indicates that when the surveying instrument was at a depth of only one stand of pipe, the well deviated toward the north approximately ⅕th of one degree, and the second plotted point 94 indicates that at the depth of two stands, the deviation was in the same direction but approximately ⅖ths of a degree, and so on. After the points have been plotted in this manner, they should be connected by a line 96. However, in view of the fact that the deviation probably was somewhere between north and east, or between north and west, it will be necessary to employ another graph similar to the graph 91, but showing the deviation east and west, which is to be used in conjunction with the graph 91 to gain a complete understanding of the extent and direction of the deviation of the well at any given point. The graph 92 upon Fig. 9, should also be made. This graph is laid off according to polar coordinates with the degrees of angularity of a given portion of a well with respect to the vertical, represented as the length of the polar radius and with the direction of the deviation represented as angular displacement of the polar radius of that point on the graph from a given point of the compass. Adjacent each point 97 plotted in this manner upon the graph 92, should be placed the number 98 corresponding to the number of stands of pipe employed at the time the given photographic chart 12 was made. In this manner, they should be connected by a line 99. Thus it will be understood that the graph 92 presents a graphic representation of the deviation of the well hole from the vertical, such as would be obtained by looking downwards upon the well drilled in transparent material.

It is to be understood that the details of the invention as herein disclosed, are subject to alteration within the spirit or scope of the appended claims.

I claim:

1. In combination with a chart having indicia thereupon in significant position in respect to each other and to said chart, a projection screen, means identifying significant portions of said screen, means for projecting an image of said chart and its indicia upon said screen, and means for determining the relative spacing between the images of said indicia, said screen and said projecting means being adjustable with respect to each other, and means indicating registration of the image of said chart with respect to said significant portions of the screen.

2. In combination with a chart having indicia thereupon in significant position in respect to each other and to said chart, a projection screen, means identifying significant portions of said screen, means for projecting an image of said chart and indicia upon said screen, adjusting means for varying the size of said image upon the screen, and adjusting means for bringing said image into register with significant portions of the screen.

3. In combination with a chart having a directional indicium thereupon and an indicium indicating displacement with respect to the direction indicated by said directional indicium, a projection screen, means for projecting an image of said chart and its indicia upon said screen, direction indicating means on said screen, and means for orienting said screen and image to bring the image of said directional indicium and said indicating indicium into proper relative position.

4. In combination with a chart having a directional indicium thereupon and an indicium indicating displacement with respect to the direction indicated by said directional indicium, a projection screen, means for projecting an image of said chart and its indicia upon said screen, direction indicating means on said screen, means for orienting said screen and image to bring the image of said directional indicium and said indicating indicium into proper relative position, and means for measuring the angular displacement between the respective image of said indicium.

5. In combination with a chart having thereon an indicium indicating a given direction, and an indicium indicating angular displacemet from said direction and linear displacement from a significant portion of said chart, a projection screen, means thereon indicating the same direction as that indicated by said directional indicium, means for projecting an image of said chart and its indicia upon said screen, means for orienting the screen with respect to the image of said chart to bring the image of said directional indicium and the indicating means of the screen into register, means for measuring the angular displacement of the image of the other indicium from said direction indicating means, and means for measuring the linear distance between the image of said other indicium and the portion of the screen corresponding to said significant portion of the chart.

6. In combination, a chart having thereon means indicating deviation of a well from the vertical and the direction of said deviation with respect to magnetic north, a projection screen, means for projecting an image of said chart upon said screen, means on said screen corresponding to the north indicating means on said chart, means for orienting said image and said screen with respect to each other, and means for ascertaining from said image the extent of said deviation from the vertical and the angular displacement of the direction thereof from magnetic north.

7. In combination, a chart having thereon an image of a compass needle and means indicating deviation of a well from the vertical and the direction of said deviation with respect to magnetic north, a projection screen, means for projecting an image of said chart upon said screen, means on said screen cooperative with the image of said needle to indicate direction, means for orienting said image and said screen with respect to each other, and means for ascertaining from said image the extent of said deviation from the vertical and the angular displacement of the direction thereof from the projected image of said compass needle.

8. In combination, a chart having thereon an image of a compass needle and means indicating deviation of a well from the vertical and the direction of said deviation with respect to magnetic north, a projection screen, means for projecting an image of said chart upon said screen, means on said screen cooperative with the image of said needle to indicate direction, calibrations on said screen representing degrees of angularity with respect to the vertical, and calibrations on said screen representing degrees of angular displacement from a given point of the compass.

9. In combination, a chart having thereon an image of a compass needle and means indicating deviation of a well from the vertical and the direction of said deviation with respect to magnetic north, a projection screen, means for projecting an image of said chart upon said screen, means on said screen cooperative with the image of said needle to indicate direction, calibrations on said screen representing degrees of angularity with respect to the vertical, calibrations on said screen representing degrees of angular displacement from a given point of the compass, and means for orienting said screen and the image of said chart with respect to each other.

10. In combination, a chart having thereon an image of a compass needle and means indicating deviation of a well from the vertical and the direction of said deviation with respect to magnetic north, a projection screen, means for projecting an image of said chart upon said screen, calibrations on said screen representing degrees of angularity with respect to the vertical, calibrations on said screen representing degrees of angular displacement from a given point of the compass, and means for adjusting said screen and the image of said chart with respect to each other to bring into register their respective points indicating true vertical.

11. The method of charting the deviation of a well from the vertical, which comprises successively projecting onto a screen images of a series of photographs which have been taken at different elevations within a well, each photograph having thereon an image of a compass needle and an image of the bubble of a circular spirit level, measuring on said screen the distance of each projected image of said bubble from the point of the screen indicating true vertical, measuring the angular separation of said bubble from a given direction, and charting the data obtained by the measurements so made.

12. The method of charting the deviation of a well from the vertical, which comprises successively projecting onto a screen images of a series of photographs which have been taken at different elevations within a well, each photograph having thereon an image of a compass needle and an image of the bubble of a circular spirit level, orienting said screen and the projected image of each photograph with respect to each other to bring corresponding directions on each into register, measuring on said screen the distance of each projected image of said bubble from the point of the screen indicating true vertical, measuring the angular separation of said bubble from a given direction, and charting the data obtained by the measurements so made.

13. The method of charting the deviation of a well from the vertical, which comprises successively projecting onto a screen images of a series of photographs which have been taken at different elevations within a well, each photograph having thereon an image of a compass needle and an image of the bubble of a circular spirit level, adjusting said screen and the projected image of each photograph with respect to each other to bring the point of each indicating true vertical into register, measuring on said screen the distance of each projected image of said bubble from the point of the screen indicating true vertical, measuring the angular separation of said bubble from a given direction, and charting the data obtained by the measurements so made.

14. The method of charting the deviation of a well from the vertical, which comprises successively projecting onto a screen the images of a series of photographs which have been taken at different elevations within a well, each photograph having thereon means indicating a predetermined direction, an image of the bubble of a circular spirit level, and means indicating the position of the bubble when that portion of the well within which the level is situated is truly vertical, orienting said screen and the projected image of each photograph with respect to each other, adjusting the screen and projected image with respect to each other, rotating a ring encircling the screen and having thereon graduations corresponding to degrees of the compass, measuring the distance between the center of the projected image of the bubble and that point on the screen corresponding to zero deviation, measuring on said ring the angular displacement of the center of the projected image of said bubble from said given direction, and charting the data obtained by the measurements so made.

15. The method of charting the deviation of a well from the vertical, which comprises successively projecting onto a screen images of a series of photographs which have been taken at different elevations within a well, each photograph having thereon an image of a device indicating direction in respect to the points of a compass and an image indicating by its position deviation from the vertical, measuring on said screen the distance of each projected image indicating by its position deviation from the vertical from the point of the screen indicating true vertical, measuring the angular separation of said last named image from a given direction, and charting the data obtained by the measurements so made.

In testimony whereof I have signed my name to this specification.

JOHN W. PETERSON.